July 23, 1940.  G. M. KRIEGBAUM ET AL  2,209,029
TRACTOR ATTACHED IMPLEMENT
Filed Sept. 4, 1936   5 Sheets-Sheet 1

Patented July 23, 1940

2,209,029

UNITED STATES PATENT OFFICE 2,209,029

TRACTOR ATTACHED IMPLEMENT

George M. Kriegbaum and Clarence C. Haas, Richmond, Ind., assignors to International Harvester Company, a corporation of New Jersey Application September 4, 1936, Serial No. 99,359

12 Claims. (Cl. 97—47)

This invention relates to planters and more particularly to a direct connected tractor planter in which the planter and its mechanism is wholly supported from the tractor.

The main object of the invention is to mount a direct connected planter on a tractor, so that the entire weight of the planter frame structure and mechanism, when transported, will be carried by the tractor.

Another object of the invention is to provide the planter attachment with quick attachable features, so that it may be readily attached and detached from the tractor.

Another object of the invention is to provide lifting means whereby the planter may be easily raised from ground engaging to transport position.

A more specific object of the invention is to provide ratchet lifting mechanism for raising the planter attachment and also to provide connections whereby the planter attachment may be raised by power lift mechanism driven from the tractor motor.

Other objects and advantages will appear in the following description of a preferred embodiment of the invention as illustrated in the accompanying drawings, wherein:

Figure 1 is a side view of the rear portion of a tractor with the usual power lift mechanism, having the novel planter construction mounted thereon and showing the ratchet lift of the planter, the tractor having the right rear wheel removed;

In the construction illustrated, a tractor of the well known tricycle type has an oblong casing 20 forming the rear end of the tractor body and containing the transmission and differential mechanism. The rear portion of this casing has bolted or otherwise secured to it on each side aligned tubular axle housings 21, which form a transversely extending frame portion of the tractor containing the bearings for axle shafts 22, which extend beyond the ends of the housing. Traction wheels 23 are adjustably secured to the axle ends. The casing 20 supports a centrally located driver's seat 24 in convenient relation to the usual steering wheel 25 and other controls, not shown. The casing 20 has suitable bearings for a central power take-off shaft 26, which projects from the rear wall thereof and is driven through suitable gearing within the casing. By means of the power take-off shaft, closely coupled implements requiring power may be driven therefrom. Cast integrally on the axle housings 21 are inner and outer flanges 27 and 28. Secured to the inner flanges 27 are coupling members 29 to which the quick detachable planter is attached. The coupling members 29 are disclosed and claimed in assignee's copending application of Carl W. Mott, Serial No. 29,938, filed July 5, 1935.

In the present invention the supporting structure for the direct connected tractor planter consists of two downwardly extending right and left hand members 30 and 31, respectively, connected to the coupling members 29 by the usual quick detachable coupling means as disclosed in the previously mentioned copending application of Carl W. Mott. As the planter attachment structure disclosed in Figures 1, 2, 6 and 7 is the same, like reference characters will denote similar parts. The supporting members 30 and 31 have formed integrally therewith at their upper ends forwardly projecting portions 32, which are slotted to permit the passage of securing bolts 33 of the coupling members 29. The forwardly extending members 32 also act as a guide and support for the planter attachment when it is being attached to the tractor. Similarly, the supporting members 30 and 31 are attached to the coupling members 29 by another pivoted securing member 34, which passes through a slot in the outwardly extending leg of the supporting members 30 and 31. Secured to the bottom of the downwardly extending supporting members 30 and 31, respectively, and extending rearwardly and upwardly are right and left hand supporting members 35 and 36 which are secured in spaced apart relation at their upper ends by spacing members 37. To secure the supporting members 35 and 36 in their correct alignment with the tractor, rearwardly extending right and left hand braces 38 and 39 extend from the supporting members 30 and 31 to the upper ends of the supporting members 35 and 36 where they are secured. The foregoing structure forms a supporting frame for attaching the implement attachment to the transversely extending frame portion of the tractor.

Figures 1, 13:
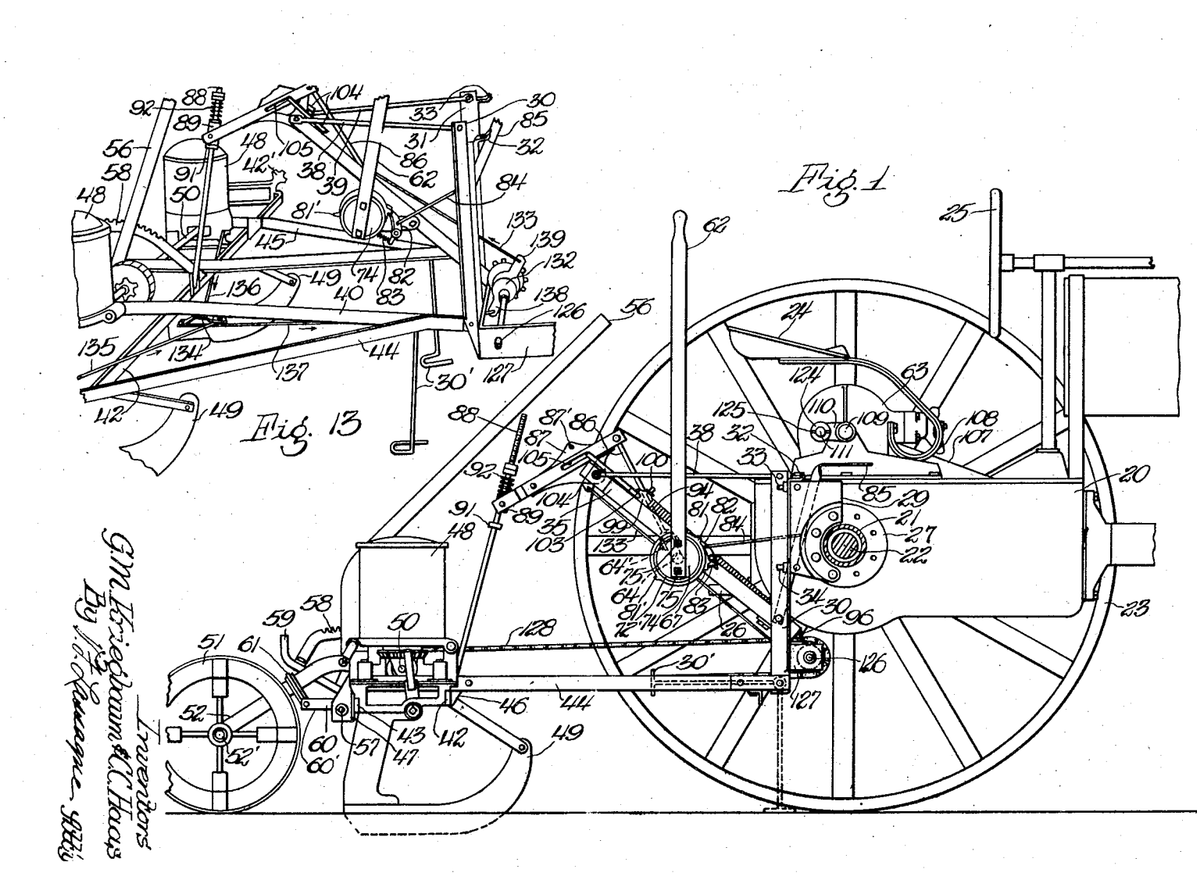
Figure 2:
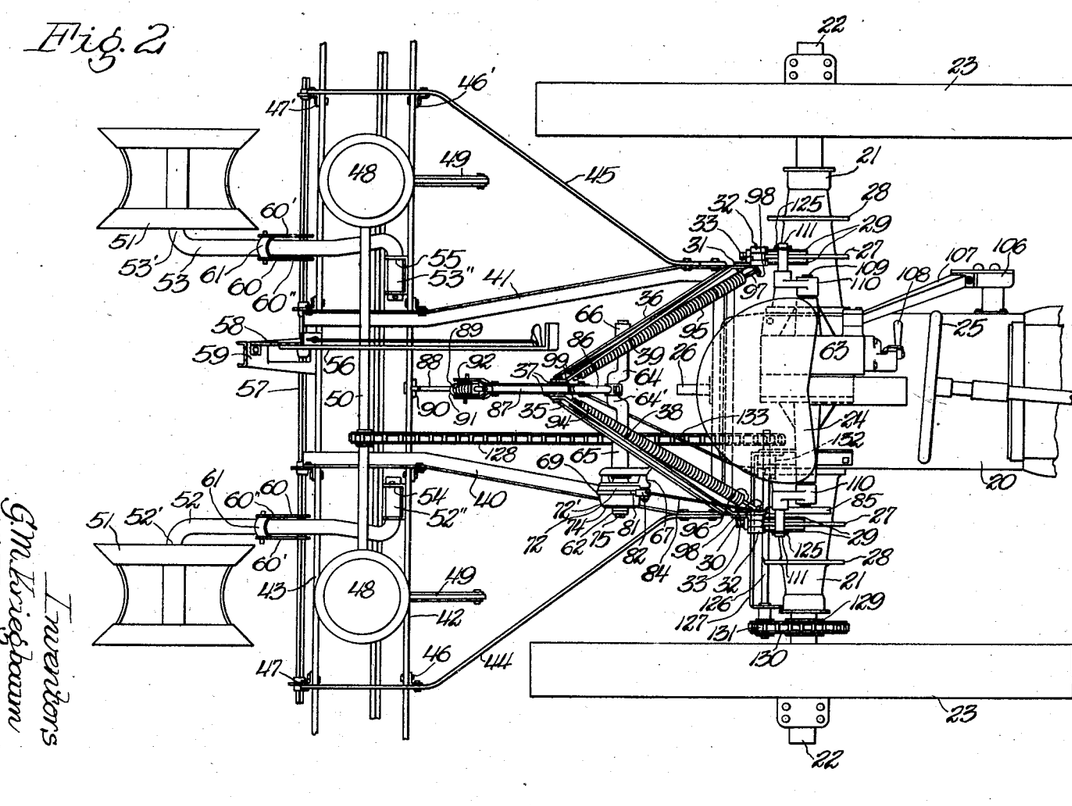
Figure 2 is a plan view of the planter mechanism shown in Figure 1.

Pivoted at the lower ends of the supporting members 30 and 31, respectively, are rearwardly extending right and left hand frame members 40 and 41 which are pivoted to permit the vertical adjustment of the planter attachment secured thereto and which will now be described. Secured at the rear of the rearwardly extending members 40 and 41 are front and rear transversely extending frame members 42 and 43, respectively. The front and rear frame members 42 and 43, respectively, are securely braced by forwardly extending braces 44 and 45 connected at their front ends, respectively, to the longitudinally extending frame members 40 and 41 and at their rear ends to the downwardly extending bracket members 46 and 46' and 47 and 47' secured to the front frame member 42 and the rear frame member 43, respectively. Altogether, the rearwardly extending members 40, 41, the transverse members 42, 43, and brace members 44, 45 form the implement frame. Mounted on the frame members 42 and 43, which form the support for the driving mechanism for the planter, are the usual hoppers 48 and furrow openers 49. It is to be understood that the planter mechanism is operated as disclosed and claimed in the applicants' copending application, Serial No. 57,226, filed January 2, 1936, and, as the subject-matter of this application relates to the lifting mechanism for raising the direct connected planter, the frame structure and planting mechanism need not be described in full. The transverse shaft 50 has a spline to permit the lateral adjustment of the planting units 48. The depth of the planter is gauged by gauge wheels 51, which are symmetrically placed about the longitudinal axis of the planter and trail behind furrow openers 49 of each planter unit and act as covering wheels for the furrow left by the furrow opener and seed depositing units attached to the rear of the furrow openers. The gauge wheels 51 are rotatably mounted on a transversely extending portion 52' and 53' of wheel arms 52 and 53. The wheel arms 52 and 53 are pivotally supported on the front member 42 by supporting brackets 54 and 55, through which inner extending transverse portions 52'' and 53'' are journaled. The supporting brackets with their wheel arms 52 and 53 may likewise be adjusted laterally according to the row spacings of the planter units 48. As best shown in Figures 1 and 2, the gauge wheels 51 are adjusted simultaneously by means of an adjusting lever 56 secured to a transverse rockshaft 57. The lever 56 is secured in adjusted position by the usual detent and the notches of an adjusting quadrant 58. The adjusting quadrant 58 is supported on a rearwardly extending bracket 59 secured to the rear frame member 43. Adjustably mounted on the transverse rockshaft 57 are rearwardly extending crank arms 60, as best shown in Figures 1 and 2. The crank arms 60 comprise two rearwardly extending members 60' and 60'', having their forward ends notched and engaging the transverse rockshaft 57. Pivotally mounted at the rear end of the crank members 60' and 60'' is a wheel arm engaging member 61, which acts, as the adjusting lever 56 is moved rearwardly, to engage the wheel arms 52 and 53, as shown in Figures 1 and 2, to adjust the planter furrow openers 49 upwardly or to a shallow planting depth. As the adjusting lever 56 is moved forwardly, the furrow openers 49 are adjusted to a deeper planting depth. The wheel arms 52 and 53, since they are pivoted to the front frame member 42, have arched portions extending over the top of the rear frame member 43, which is lower than the front frame member 42. It is thus seen that, when the planter frame is raised by a master lever 62, or a power lift mechanism 63 for transport, the operation and mechanism of which will be described later, the wheel arms 52 and 53 with their corresponding gauge wheels 51, as they are pivoted to the front frame member 42, allow the gauge wheels 51 to remain on the ground until the transverse frame of the planter has been raised a sufficient height for the rear frame member 43 to engage the underside of the wheel arms 52 and 53 to raise the gauge wheels 51 to transport position simultaneously. Since the wheel arm engaging member 61 only engages the top of the wheel arms 52 and 53, there is formed a lost motion connection between the crank arm 60 and the wheel arms 52 and 53, so that the weight of the planter frame acts to cause the wheel arm engaging member to engage the wheel arms 52 and 53 only when the gauge wheels 51 are engaging the ground. When the planter is in transport position, the wheel arms 52 and 53 are engaged by the rear frame member 43, holding the gauge wheels 51 in transport position, while the adjusting crank arm 60 with its wheel arm engaging member 61 does not engage the wheel arms 52 and 53. The gauge wheels 51 are both simultaneously adjusted when the planter is locked for planting by the lever 56 and, likewise, both gauge wheels 51 are raised in transport position when the rear frame member 43 engages the underneath portion of the respective wheel arms 52 and 53.

Figure 3:
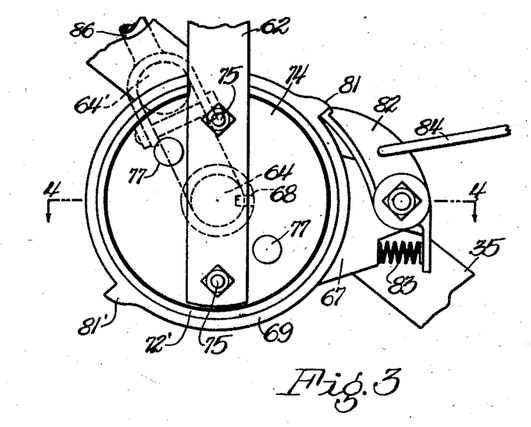
Figure 3 is an enlarged view of the side elevation of the ratchet lift mechanism.
Figure 4:
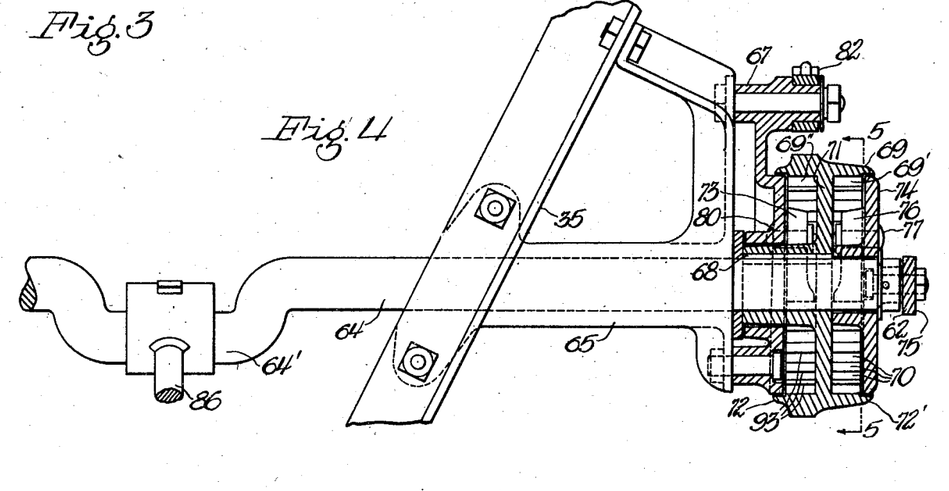
Figure 4 is a section taken along line 4—4 of Figure 3, looking in the direction of the arrows and showing part of the ratchet lift mechanism in section.
Figure 5:
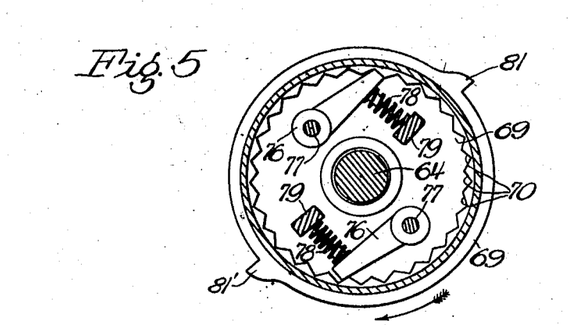
Figure 5 is a section along line 5—5 of Figure 4, looking in the direction of the arrows and showing the pawl construction of the ratchet lift mechanism.

As best shown in Figures 1 and 2, the planter frame with its mechanism is raised from its trailing planting position to transport position by the master lever 62. The master lever 62 and its lifting mechanism is mounted on the supports 35 and 36. A transverse eccentric shaft, or rotatable member, 64 is journaled in bearings 65 and 66. A bearing 65 is formed as a housing and support, as best shown in Figure 4. Mounted on the support 65 is a pawl or detent support 67. Mounted on the shaft 64 and keyed thereon by a key 68 is a clutch housing 69. The clutch housing, or ratchet member, 69 is divided into two compartments 69' and 69'', the inner circumferential surface of which has pawl notches 70 cast integral with the housing 69. A center web 71 separates the two compartments 69' and 69''. The housing 69 has circumferential lips 72 extending about the pawl support 67. Mounted on the pawl support 67 are pawls 73 placed in diametrically opposite positions, as shown in Figure 4. The pawls 73 with the pawl notches 93 form stop means for preventing the return of said implement attachment to its ground-engaging or unraised position when it is being raised. Mounted on the outer end of the shaft 64 is a circular pawl housing cap 74. To this cap 74, the master lever reciprocatory member, 62 extending within reach of the operator's station, is secured, as best shown in Figures 1 and 3. The lips 72', similar to the lips 72, extend over the pawl cap 74. These lips 72 and 72' act as shields to prevent water and dirt from entering the ratchet lifting mechanism. The handle 62 is secured to the pawl cap 74 by bolts and nuts 75. Pawls 76, similar to the pawls 73, are mounted on the pawl cap 74 by the studs 77. The pawls 76 are held against the pawl notches 70 by pawl springs 78 held in place by a lug 79 cast integral with the pawl cap. The pawls 76 and 73 are placed to lie in the same direction. Figure 5 shows the position of the pawls 76 mounted on the pawl cap 74. The pawls 76 extend in the same direction with their ends engaging the notches 70, so that the clutch housing 69 may be rotated in a clockwise direction. The pawls 73 are attached to the pawl support 67 by studs 80 similar to the studs 77. It is, therefore, obvious that a ratchet mechanism has been formed whereby, upon the reciprocatory movement of the master lever 62, the planter frame may be raised and lowered. The foregoing structure forms a lifting means comprising ratchet means whereby said implement frame may be raised upon the ratcheting of said ratchet means. The ratchet housing 69 has on its periphery outwardly extending latch stops 81 and 81' placed at diametrically opposite positions. These stops are engaged by a detent 82 pivoted on pawl support 67, as best shown in Figure 3. The detent 82 is held in its engaged position with the latch stop 81 by a spring 83. Extending forwardly from the detent or latch 82 is a latch rod 84. The latch rod 84 is pivotally connected to the latch 82 at its rear end, and, at its forward end, is connected to a foot trip lever 85. The foot trip lever is pivotally mounted on the support 30, as best shown in Figure 1. The foregoing structure forms releasable locking means adapted for retaining and releasing said implement attachment in its raised or unraised position.

The transverse shaft 64 at its mid-portion has an eccentric crank portion 64'. Attached to the eccentric portion 64', which forms an eccentric means, and pivotally mounted thereon is an upwardly extending link 86, which forms means for connecting said eccentric means and a pivoted supporting means. At its upper end the link 86 is pivoted to a pivotable member 87 forming a pivoted supporting means mounted on a supporting frame of the implement attachment. The member 87, which forms the supporting means, is mounted at the upper ends of the support members 35 and 36, which act to form a rearwardly extending boom. The rod 86 is attached to the member 87 at its forward end, and at the rear end of the member 87 is attached a lifting link 88. The link 88 is attached to the member 87 by means of a lost motion connection 89, which permits the member 88 to be slidably mounted therein. The lifting link 88 is pivotally connected at its lower end to the transverse frame member 42 by a connection 90. The upper end of the rod 88 is threaded to permit the rod to be lengthened and forms means for adjusting the supporting means whenever it is necessary to use the planter over terraces. When the planter is used to plant over terraces, it is necessary for the planter to have greater vertical movement. As the rear wheels of the tractor are on the ridge of the terrace, the planter shoes must engage the ground to plant uniform depths at all times. If this adjustment were not provided, a direct mounted planter, as it planted over the terraces, would be entirely supported in mid-air, which is not a desirable condition. A collar 91 is provided to secure the rod in fixed position with respect to the member 87 when the planter is detached from the tractor in order to keep the attaching parts, such as the supports 30, in a vertical position, so that the tractor and planter may be readily connected. A spring 92 on the rod 88 acts to relieve the planter of shocks, as it is raised or lowered.

In the operation of the ratchet lifting mechanism for raising the planter, the operator, seated at the operator's station 24, releases the detent 82 by the foot lever 85 after he has taken hold of the lever 62. Then, by pulling, reciprocatory motion of the handle 62, he may raise the planter attachment to transport position. As the lever 62 is ratcheted, the pawls 76 engaging the notches 70 rotate the housing 69 and, as the housing 69 is secured to the shaft 64, reciprocation of the lever 62 will cause the rotation of the shaft 64. The shaft 64 is held from rotating in reverse direction by means of the pawls 73 engaging the notches 93. As shown in Figure 5, the pawls 76 may be so positioned that one pawl at a time engages a notch 70. When the pawls are thus placed the distance traveled by the lever 62 in raising the planter may be shortened by half. As the clutch housing 69 is ratcheted through one-half a revolution the detent 82 engages the latch stop 81'. In this position the planter attachment will be raised to its full height for its transport position. When it is desired to drop the planter for planting, it is only necessary to step on the foot lever 85 to release the latch 82 from the latch stop 81'. While the housing 69 and shaft 64 is prevented always from turning in a counter-clockwise direction by the pawls 73, there is nothing to prevent their turning in a clockwise direction when the latch 82 is released. Thus, if the planter frame is in transport position, the weight of the same acts on the crank portion 64' in clockwise direction and the pawls 76 will ratchet. The planter frame thereupon falls unchecked except through balancing springs upon release of the latch 82. The angular relationship of the stop 81' and the crank portion 64' is such as to give this effect. The depth of planting is adjusted by the lever 56 extending to within reach of the operator. By adjusting the lever 56 the depth of the planter shoes 49 may be adjusted at will. The lost motion connection at 89 permits the planter to follow the contour of the ground.

Figures 6, 8, 9, 10:
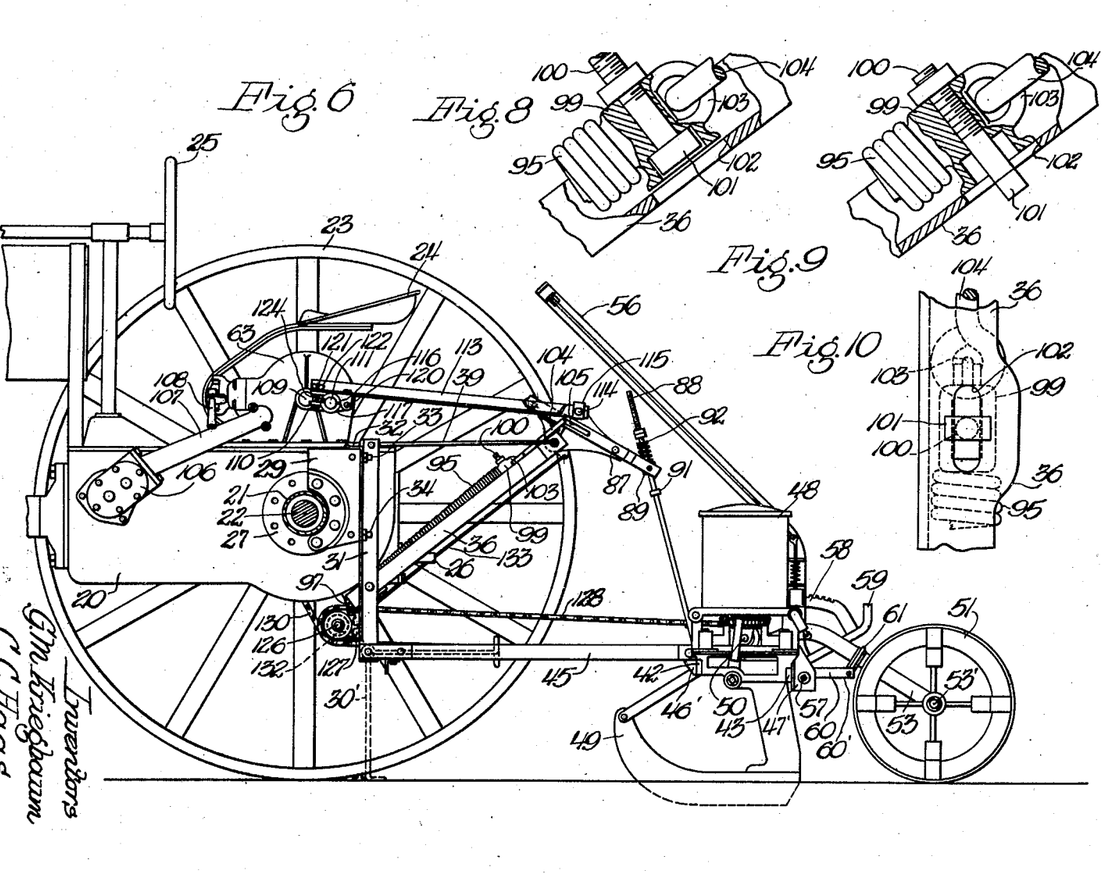
Figure 6 is a side view of the rear portion of the tractor with the usual power lift mechanism having the novel planter construction mounted thereon and the lifting mechanism of the planter connected to the power lift mechanism of the tractor, the tractor having the left rear wheel removed.
Figure 8 is an enlarged detailed section of the counterbalancing spring mechanism and its connection to the planter lifting mechanism.
Figure 9 is an enlarged detailed section of the counterbalancing spring with the spring mechanism locked in place.
Figure 10 is a bottom view of Figure 9.

As the weight of the planter is very great, it is necessary to counterbalance its weight. This is done by having counterbalancing springs 94 and 95, which provide means for counterbalancing the weight of the implement frame and connect the pivoted supporting means to the supporting frame. These counterbalancing springs are best shown in Figures 1, 2, 8, 9 and 10. The counterbalancing springs are adjustably secured at their lower ends by adjusting bolts 96 and 97 to supports 98. The supports 98 are secured, respectively, to the supports 30 and 31. The springs 94 and 95 are inclined upwardly and rearwardly in the form of an inverted V and intersect at the upper end of the supports 35 and 36. As the connections of the upper end of each spring 94 and 95 are the same, only one connection will be described. This connection is best shown in Figures 8, 9 and 10. A casting 99 is screwed into the upper end of the springs 94 and 95. This casting at its bottom side engages a leg of the supports 35 or 36. Mounted in the casting is a clamp bolt 100 having a T-head 101. When the planter is being used, the bolt 100 is in its position as shown in Figure 8. However, when the planter is to be supported for detached position, the bolt is positioned as shown in Figure 9 and forms means for securing the counterbalancing springs in an inactive position. A slot 102 is formed in the leg of the supports 35 and 36. The head 101 is passed through this slot and turned at right angles to the slot, as shown in Figure 9. The bolt 100 is then secured, as shown in Figure 9, thus firmly clamping the casting or member 99 to the support 35 or 36. At the upper end of the member 99 is an eye portion 103. Pivotally mounted in this eye portion 103 is a link 104. The link 104 is in the form of a V, the apex of which is slidably mounted in a slot 105 of the member 87, as best shown in Figures 1 and 6. It is, therefore, obvious that a counterbalancing connection has been made between the counterbalancing springs 94 and 95 and the lifting member 87, as the member 104 is connected to each member 99 of the counterbalancing springs 94 and 95.

The use of the clamp bolts 100 to secure the springs when the planter is detached is primarily a safety measure, as these springs are very powerful and would cause such members as 62 to injure a person when the planter is being detached. By thus securing the springs, certain members become rigid, therefore permitting the members 30 to remain in a vertical position when the planter is detached and attached. In detaching the planter from the tractor, pivoted supports 30' are lowered to their dotted position, as shown in Figure 1, after the tractor and planter have first been driven on level ground. The collar 91 is then secured against the member 89, thus taking up the lost motion connection at 89 and making the attachment rigid. The counterbalancing springs 94 and 95 are then secured, as shown in Figure 9. When this is done, the members 40, 88, 87, and 35 and 36 with the member 30 are held rigid with respect to each other. When this is done, the securing bolts 33 and 34 may be loosened and swung through their respective slots and the tractor driven away. The supports 30 and 31 will remain in a vertical position, so that the tractor may be readily attached again.

It is, therefore, obvious that a simple raising mechanism has been described by which a direct connected planter may be raised. It is obvious that simple means have been provided for the attaching and detaching of this direct connected planter in which several of the frame portions of the tractor (such as the lower planter frame mechanism and its driven connections, and the upper boom construction formed by the members 35, 36, 38 and 30, although they are movable relatively to each other in planting position), may be held rigid with respect to each other for attaching and detaching the planter attachment as a whole to the tractor. It is to be understood that the planter attachment may be readily attached to the tractor by going through the previous operations in the reverse order.

Figures 7, 11, 12:
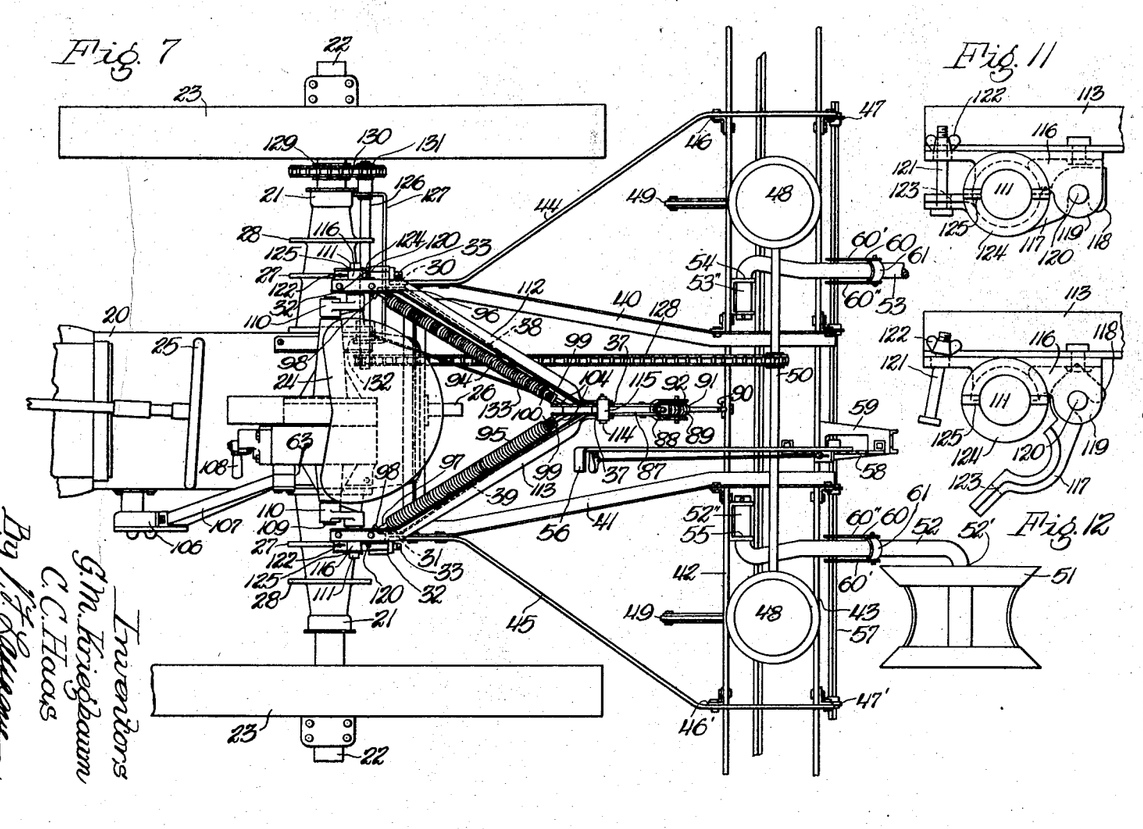
Figure 7 is a plan view of the planter mechanism shown in Figure 6 with the lift mechanism of the planter connected to the power lift mechanism of the tractor.
Figure 11 is a detailed view of the lifting arm and its connection to the power lift mechanism.
Figure 12 is a detailed view of the lifting arm and its connection to the power lift mechanism with the connection to the power lift mechanism in detached position; and, Figure 13 is a perspective view showing the mechanism for releasing the doffing mechanism of the check-heads.

In the modifications shown in Figures 6, 7, 11 and 12, the planter attachment is shown attached to the tractor, as previously described, but with the lifting mechanism of the planter attached to the hydraulic lifting mechanism. As the planter mechanism and its attaching parts, as shown in Figures 6 and 7, are the same as that disclosed in Figures 1 and 2, like reference numerals will describe similar parts, and, since the planter and its mechanism has been carefully described, only the attaching parts to the hydraulic lift mechanism will now be described.

A hydraulic lift mechanism 63, as shown in Figures 1 and 6, is actuated through a pump 106 driven from a power take-off shaft and forms a power lift mechanism actuated from the motor of a motor propelled vehicle or tractor. The passages from the pump to the hydraulic lift mechanism are cored in a housing or pipe 107. The mechanism is actuated by a control handle 108 positioned within reach of the operator's station 24. The control handle 108 may be actuated to cause the vane mechanism in the hydraulic lift mechanism to be actuated at two speeds, a slow speed and a high speed. This hydraulic lift mechanism is the same as that disclosed and claimed in assignee's copending application of E. A. Johnston, Serial No. 87,889, filed June 29, 1936. Extending from each side of the hydraulic lift mechanism is a transverse rockshaft 109. Mounted on each end of the rockshaft 109 are eccentric crank arms, or laterally spaced lifting connections, 110. Extending laterally from the crank arms 110 are crank pins 111 to which rearwardly and inwardly extending lifting links, or divergent members 112 and 113, are attached. The lifting links 112 extend rearwardly for a distance and then inwardly in the form of a V when attached together. The lifting links 112 and 113 at their rear ends are pivotally attached to the member 87 by the pin 114 extending through the hole 87', as best shown in Figure 1. The U-shaped washer 115 serves to retain the rear ends of the lifting rods 112 and 113. The lifting links 112 and 113 are detachably connected to the crank arms of the hydraulic lift mechanism, as best shown in Figures 6, 11 and 12. A bearing portion 116 is secured to the members 112 and 113 and has pivotally attached to the bearing portion 116 a cap member 117. The cap member and the bearing portion 116 and cap 117 each form one-half of a completed bearing. The cap member 117 has a U-shaped hook portion 118 mounted between lug portions 119, which form a slot for the member 118. A pin 120 extending through the lug portions 119 is engaged by the hook member 118. The cap member 117 is clamped against the bearing portion 116 by means of a bolt 121 and a wing nut 122. As shown in Figure 12, the cap portion 117 may be disconnected by loosening the wing nut 122 to permit the bolt 121 to be slid from a slot 123 of the cap 117. The bearing members 116 and 117 when attached to the lifting links 112 and 113 are held from lateral movement on the crank pin 111, as shown in Figure 7, by means of washers 124 and cotter keys 125.

In order to raise the planter attachment to transport position from its position shown in Figure 6, the control handle 108 is actuated to a position opposite to that shown. As the pump 106 is running continuously, the pressure of the fluid actuates the vane lift mechanism to move the crank arms into a position opposite to that shown in Figure 6, thereby raising the planter attachment to transport position. The movement of the vane lift mechanism in the hydraulic lift mechanism is greater than 180 degrees. Therefore, when the planter mechanism is in raised position, the lifting links 112 and 113 form an over-the-center lock for the supporting means 87, which prevents the planter attachment from being returned to planting position in the event of failure of the hydraulic lift mechanism. Similarly, as shown in Figure 6, the position of the crank arm 110 and the lifting links 112 and 113 form an over-the-center lock for the planter attachment in its ground working position. As the connection 89 with the link 88 forms a lost motion connection, it is obvious that, when the lifting mechanism is in lowered position so that the planter attachment is in planting position, the planter is free to rise and fall to conform to the contour of the ground and that any adjustment in planting depth may be accomplished by the adjusting lever 56, as previously described.

As previously described, the lifting lever 56 actuates the gauge wheels 51 to raise or lower them to whatever planting depth is desired. If it is desired to raise or lower the planting attachment more slowly, the valve control handle 108 is turned one-quarter of a turn to that shown in Figure 6, thereby throttling the control valve and causing the vane lift mechanism to be actuated more slowly. With the hydraulic lift mechanism described the planter mechanism is raised and lowered by means of the hydraulic pressure and it is not free to fall in lowering by the force of gravity alone. In order to counterbalance the weight of the planter attachment, counterbalancing springs 94 and 95 are used, as previously described, for the ratchet lift mechanism.

In attaching or detaching the planter attachment, the procedure is the same as that previously described. The supports 30' are lowered in a ground engaging position, as shown in the dotted lines in Figure 6; the collar 91 is adjusted to prevent the connection 89 from functioning as a lost motion connection, thereby making the connection of the rod 89 and 88 rigid; the pressure springs 94 and 95 are secured, as previously described, by clamping the connection 99 to the members 35 and 36, thus locking the link 104 at the upper end of the slot 105. As previously described, this acts to make the members 40, 88, 87, 35 and 36 of the boom structure rigid, so that the support members 30 and 31 are held in vertical position in order that the tractor may be readily attached or detached. The clamping bolts 33 and 34 of the coupling members 39 may then be loosened and swung through their corresponding slots in the members 30 and 31. The links 112 and 113 have been detached after the members 99 of the counterbalancing springs 94 and 95 have been secured. The links 112 and 113 have been released by loosening the wing nuts 122, allowing the cap members 117 to fall free. The link members 112 and 113 may then be swung upwardly. The power lift may then be actuated from its position shown in Figure 6 to swing the crank portions forwardly, thereby permitting the links to be dropped down. The tractor may then be driven away. It is to be understood that the planter attachment may be readily attached to the tractor by going through the previous operations in reverse order.

The planter mechanism of the planter attachment is driven from a transverse shaft 126 supported from the support 30 by means of a U-shaped supporting bracket 127. As the driving mechanism for the planter attachment described in Figures 1 and 6 is the same, like reference characters will denote similar parts. From a sprocket mounted on the shaft 126, the planter mechanism is driven by a flexible chain 128 which, in turn, drives the transverse shaft 50, which drives the hopper mechanisms. The planter mechanism is driven proportionately to the travel of the tractor. This is accomplished by driving the transverse shaft 126 from the rear axle 22 of the tractor. A sprocket 129 is mounted on the rear axle 22. A flexible driving chain 130 connects the sprocket 129 with a sprocket 131 on the drive shaft 126. It is obvious that, when the tractor is attached to, or detached from, the planter attachment, the chain 130 must be detached or attached. When the planter is raised or lowered, a clutch mechanism 132, which is the same as that described in the copending application of Kriegbaum and Haas, Serial No. 57,226, filed January 2, 1936, is thrown in or out of engagement by a link 133 connected to the lifting member 87, as best shown in Figures 1, 2, 6, and 7. The clutch throw-out mechanism is the same for both the ratchet lift mechanism and for the hydraulic lift mechanism. With the clutch throw-out mechanism, the planter mechanism is thrown out of operation as soon as the planter is raised and thrown into operation when the planter attachment is lowered.

In Figure 13 are shown the connections for releasing the doffing mechanism, which is disclosed in applicants' copending application Serial No. 57,226, previously referred to. Pivotally mounted on the longitudinally extending frame member 40 ahead of the transverse member 42 is a triangular shaped tripper rocker arm 134. Connected to the tripper rocker arm 134 at its forward position and so mounted that they move in opposite directions are trip rods 135 and 136, which extend to the doffer mechanism for releasing the check-wire from the check-heads, as the planter attachment is raised at the end of the row. A check-head trip rod 137 extends forwardly from the trip rocker arm 134 and is connected at its front end to a shifter cam arm 138. The shifter cam arm 138 is opposite to an upper shifter cam arm 139 to which the link 133 for throwing out the clutch mechanism 132 is connected. It is, therefore, evident that, as the planter attachment is raised, the movement of the link 133 causes the lower shifter cam arm 138 to move forwardly, which, in turn, causes the trip rods 135 and 136 to move inwardly, thus disconnecting the doffer mechanism of the check-heads from the check-wire.

As will be obvious to those skilled in the art, other implements can be attached to the implement frame structure which has been described, or other forms of planter mechanisms may be used. It is also to be understood that other forms of lifting mechanisms may be used for raising the implement frames and a wide range of utility is, therefore, attainable to meet any requirements arising in connection with the implement frame and its planter attachment. It is further understood that materials suitable to the stresses encountered in a direct connected attachment of this nature are to be used.

The preferred embodiment of the invention herein described is capable of certain modifications without departure from the scope of the invention to be defined in the following claims.

What is claimed is:

1. The combination with a tractor having a transversely extending frame portion and an operator's station, of an implement attachment wholly supported therefrom when in transport position, said implement attachment comprising a supporting frame for attaching said implement attachment to the aforesaid frame portion, an implement frame pivotally mounted on said supporting frame for vertical movement, rearwardly extending support members carried by the supporting frame and overhanging the implement frame, pivoted supporting means mounted on the aforesaid support members removed from the operator's station and connections between the same and the implement frame, ratchet lifting means and connections between the same and the aforesaid pivoted supporting means, and said ratchet lifting means being located on the support members forwardly removed from the pivoted supporting means and nearer to the operator's station.

2. The combination with a tractor, of an implement attachment wholly supported therefrom when in transport position, said implement attachment comprising a supporting frame, an implement frame connected thereto for vertical movement, lifting means comprising pivoted supporting means mounted on said supporting frame, means for counterbalancing the weight of the implement frame connected between the aforesaid pivoted supporting means and the supporting frame, and means for securing the counterbalancing means to the supporting frame to render the same inactive.

3. The combination with a tractor, of an implement attachment wholly supported therefrom when in transport position, said implement attachment comprising a supporting frame having means for quickly attaching and detaching said implement attachment to and from said tractor, an implement frame connected thereto for vertical movement, lifting means comprising pivoted supporting means mounted on said supporting frame, a lost motion connection between said pivoted supporting means and said implement frame, means for taking up the lost motion in said connection, means for securing said pivoted supporting means to the supporting frame, and ground engaging supporting means for the forward end of said implement attachment, whereby when said lost motion connection is taken up and said pivoted supporting means are secured said implement attachment may be supported in detached position for subsequent attachment.

4. The combination with a tractor, of an implement attachment wholly supported therefrom when in transport position and adapted when detached from said tractor to be supported in detached position for subsequent attachment, said implement attachment comprising a supporting frame, an implement frame connected thereto for vertical movement, lifting means comprising pivoted supporting means mounted on said supporting frame, means for counterbalancing the weight of the implement frame connected between the aforesaid pivoted supporting means and the supporting frame, and means for securing the aforesaid counterbalancing and pivoted supporting means to the supporting frame whereby the implement attachment will be rigid in its detached position, said securing means being releasable whereby the counterbalancing means is operable to counterbalance the implement frame in its vertical movement in its attached position.

5. The combination with a tractor, of an implement frame supported therefrom, means for raising said implement frame comprising a ratchet lifting mechanism, said ratchet lifting mechanism comprising a rotatable member having an eccentric lifting connection thereon, means for rotating the aforesaid member comprising a ratchet and pawl mechanism having a ratchet member fixed to the aforesaid rotatable member, pawl means engaging the aforesaid ratchet member permitting the rotation of said rotatable member in only one direction, reciprocatory means having pawl means adapted to engage said ratchet member for rotating the aforesaid rotatable member, and releasable locking means adapted for retaining and releasing said implement frame in its raised and unraised positions.

6. The combination with a tractor having a frame structure and an operator's station, of an implement attachment wholly supported on the tractor when in transport position, said implement attachment comprising a supporting frame for attaching said implement attachment to the tractor frame structure, an implement frame pivotally mounted on said supporting frame for vertical movement, said supporting frame including a rearwardly extending portion shaped to overhang the implement frame, a pivoted supporting means mounted on the rearwardly extending portion of the supporting frame removed from the operator's station and connections between the same and the implement frame, ratchet lifting means and connections between the same and the pivoted supporting means, and said ratchet lifting means being located on the supporting frame forwardly removed from the pivoted supporting means and nearer to the operator's station.

7. The combination with a tractor, of an implement attachment wholly supported thereon when in transport position, said implement attachment comprising a supporting frame, an implement frame connected to the supporting frame for vertical movement, lifting means on the supporting frame including connections with the implement frame to operate the same, means for counterbalancing the weight of the implement frame connected between the lifting means and the supporting frame, and means for securing the counterbalancing means to the supporting frame to render the same inactive.

8. The combination with a tractor, of an implement attachment wholly supported thereon when in transport position, said implement attachment comprising a supporting frame, an implement frame connected to the supporting frame for a vertical movement, lifting means on the supporting frame including connections with the implement frame to operate the same, means for counterbalancing the weight of the implement frame connected between the lifting means and the supporting frame, and means for securing the counterbalancing means to the supporting frame to render the same inactive and means for making said lifting connections rigid with the supporting and implement frames.

9. The combination with a tractor, of an implement attachment wholly supported thereon when in transport position, said implement attachment comprising a supporting frame, an implement frame pivotally connected to the supporting frame for vertical movement, lifting means including pivoted supporting means mounted on the supporting frame and connected with the implement frame to operate the same, means for counterbalancing the weight of the implement frame connected between the lifting means and the supporting frame, and means for securing the counterbalancing means to render the same inactive and at the same time making the pivoted supporting means inoperative.

10. The combination with a tractor having a transverse rear axle structure, of an implement attachment comprising a supporting frame adapted for ready attachment to the rear axle structure, an implement frame pivotally connected to the supporting frame for vertical movement, said supporting frame having a portion overhanging said implement frame, lifting means on the supporting frame including a pivotal supporting means on the supporting frame portion and lifting connections connecting the pivotal supporting means with the implement frame, and means for fixing the pivotal supporting means to make the connections rigid with the supporting and implement frames, whereby the implement attachment may be supported in its detached position with the supporting frame portion overhanging the implement frame.

11. The combination with a tractor having a transverse rear axle structure, of an implement attachment comprising a supporting frame adapted for ready attachment to the rear axle structure, an implement frame pivotally connected to the supporting frame for vertical movement, said supporting frame having a portion overhanging said implement frame, lifting means on the supporting frame including a pivotal supporting means on the supporting frame portion and lifting connections connecting the pivotal supporting means with the implement frame, means for fixing the pivotal supporting means to make the connections rigid with the supporting and implement frames, and ground engaging supporting means for the forward end of said implement attachment, whereby the implement attachment may be supported in detached position ready for subsequent attachment.

12. The combination with a tractor having a frame structure and an operator's station, of an implement attachment wholly supported on the tractor when in transport position and comprising a supporting frame for attaching the implement attachment to the tractor frame structure, an implement frame pivotally connected to said supporting frame for vertical movement, said supporting frame including a rearwardly extending portion shaped to overhang the implement frame, lifting means including a pivoted supporting means mounted on the rearwardly extending portion removed from the operator's station and connected to operate the implement frame and ratchet means located on the supporting frame forwardly removed from the pivoted supporting means and nearer to the operator's station, said ratchet means connected to the pivoted supporting means and including a rotatable member having an eccentric lifting connection thereon, means for rotating the rotatable member including a ratchet and pawl mechanism having a ratchet member permitting the rotation of the rotatable member in only one direction, reciprocatory means having a pawl adapted to engage said ratchet member for rotating the rotatable member, and releasable locking means accessible to the operator's station adapted for retaining and releasing said implement frame in its raised and unraised positions.

GEORGE M. KRIEGBAUM.
CLARENCE C. HAAS.